(12) United States Patent
Kande et al.

(10) Patent No.: US 12,262,202 B2
(45) Date of Patent: Mar. 25, 2025

(54) SYSTEMS AND METHODS FOR CONFIGURING INDUSTRIAL DEVICES THROUGH A SECURED WIRELESS SIDE CHANNEL

(71) Applicant: ABB Schweiz AG, Baden (CH)

(72) Inventors: Mallikarjun Kande, Solon, OH (US); David Mielnik, Painesville, OH (US)

(73) Assignee: ABB Schweiz AG, Baden (CH)

( * ) Notice: Subject to any disclaimer, the term of this patent is extended or adjusted under 35 U.S.C. 154(b) by 162 days.

(21) Appl. No.: 17/400,154

(22) Filed: Aug. 12, 2021

(65) Prior Publication Data

US 2023/0052998 A1    Feb. 16, 2023

(51) Int. Cl.

| | |
|---|---|
| *H04L 29/06* | (2006.01) |
| *H04W 12/069* | (2021.01) |
| *H04W 12/08* | (2021.01) |
| *H04W 12/69* | (2021.01) |
| *H04W 24/02* | (2009.01) |
| *G05B 19/042* | (2006.01) |

(52) U.S. Cl.
CPC ......... *H04W 12/069* (2021.01); *H04W 12/08* (2013.01); *H04W 12/69* (2021.01); *H04W 24/02* (2013.01); *G05B 19/042* (2013.01); *G05B 2219/24159* (2013.01)

(58) Field of Classification Search
CPC ... H04W 12/069; H04W 12/69; H04W 12/08; H04W 24/02; G05B 19/042; G05B 2219/24159
See application file for complete search history.

(56) References Cited

U.S. PATENT DOCUMENTS

| | | | | |
|---|---|---|---|---|
| 11,502,895 | B1 * | 11/2022 | Van Oort | ............ H04L 12/4633 |
| 2015/0229516 | A1 | 8/2015 | Thanos | |
| 2018/0083916 | A1 * | 3/2018 | Xu | ....................... H04L 61/5007 |
| 2019/0215319 | A1 * | 7/2019 | Hu | ............................ G06F 21/30 |
| 2020/0259896 | A1 * | 8/2020 | Sachs | .................... H04W 12/04 |
| 2020/0293303 | A1 * | 9/2020 | Gubbala | ................... G06F 8/65 |
| 2021/0119795 | A1 * | 4/2021 | Gammel | ............... H04L 63/083 |
| 2021/0165383 | A1 * | 6/2021 | Garcia | ............... G05B 19/0423 |
| 2021/0203682 | A1 * | 7/2021 | Bajpai | ..................... G06F 21/55 |
| 2023/0017142 | A1 * | 1/2023 | Dunn | .................. H04L 63/0428 |

FOREIGN PATENT DOCUMENTS

| | | |
|---|---|---|
| EP | 2469367 A2 | 6/2012 |
| EP | 2779587 A1 | 9/2014 |

* cited by examiner

*Primary Examiner* — Joseph P Hirl
*Assistant Examiner* — Chi D Nguy
(74) *Attorney, Agent, or Firm* — McCarter & English, LLP; Michael M. Gnibus

(57) ABSTRACT

Systems and methods for configuring industrial devices through a secured wireless side channel may include a compute device. The compute device may have primary communication circuitry configured to communicate through a network and side channel communication circuitry configured to communicate through a wireless side channel that is different from the network. The compute device may additionally include circuitry configured to obtain, via the wireless side channel, configuration data indicative of a configuration for one or more operations of an industrial device of an industrial process plant. Additionally the circuitry may be configured to configure, in response to obtaining the configuration data, the one or more operations of the industrial device.

20 Claims, 6 Drawing Sheets

1. RECONFIG SESSION DURATION: ~ MIN (ENCRYPTED MSGS)
2. SESSION IS ESTABLISHED WITH ENCRYPTED MSGS (E.X. TLS)

SYSTEMS AND METHODS FOR CONFIGURING INDUSTRIAL DEVICES THROUGH A SECURED WIRELESS SIDE CHANNEL

BACKGROUND

Industrial devices (e.g., devices configured to perform operations to facilitate the execution of one or more industrial processes in an industrial processing plant) may lose their configuration settings while they are in operation. Such configuration failures can lead to loss of device connectivity (e.g., with other connected devices, engineering/operational tools, systems, etc.). For example, the network address (e.g., internet protocol (IP) address) of an industrial device may be overwritten or deleted from memory due to memory corruption. The system in which the industrial device is located typically can recover only if the industrial device is reconfigured (e.g., to re-establish connectivity between the industrial device and other devices in the system). When the main channel of communication (e.g., network communication) is no longer available, a common method to reconfigure the industrial device is through a physical interface, such as a serial (e.g., universal serial bus (USB)) interface. However, reliance on a physical interface is a labor intensive process as it requires a person to physically travel to the location of the industrial device to be reconfigured. Relatedly, the reliance on in-person access to a physical interface of an industrial device exposes an attack surface through which individuals (e.g., hackers) could adversely affect the operations of the plant.

SUMMARY

According to one aspect, a compute device may comprise primary communication circuitry configured to communicate through a network, side channel communication circuitry configured to communicate through a secure wireless side channel that is different from the network, and circuitry configured to obtain, via the secure wireless side channel, configuration data indicative of a configuration for one or more operations of an industrial device of an industrial process plant and to configure, in response to obtaining the configuration data, the one or more operations of the industrial device.

In some embodiments, the side channel communication circuitry may be configured to communicate using a Wi-Fi protocol, a Bluetooth protocol, or a cellular communication protocol. The side channel communication circuitry may be configured to communicate using a 5G cellular communication protocol.

In some embodiments, the circuitry may be further configured to utilize a security protocol for communication via the secure wireless side channel. The circuitry may be configured to obtain the configuration data via a token-based secured communication session. The circuitry may be configured to obtain the configuration data via a token-based secured communication session in which a token used for communication is not stored by the compute device or a configuration compute device from which the configuration data is received. The circuitry may be configured to utilize a token that was generated by the compute device and stored by an identity manager compute device. To obtain the configuration data may comprise to obtain the configuration data from a configuration compute device and the circuitry is further configured to utilize, for the token-based secured communication, a token that was retrieved from an identity manager compute device by the configuration compute device. The circuitry may be further configured to verify, using a predefined hash value, a token embedded in a received message that also contains the configuration data.

In some embodiments, the compute device may be the industrial device and to obtain configuration data may comprise to obtain configuration data to configure one or more operations of the compute device.

In some embodiments, to obtain configuration data may comprise to obtain configuration data to configure a device connected to the compute device.

In some embodiments, to obtain configuration data may comprise to obtain configuration data to configure a controller compute device in an industrial process plant.

In some embodiments, to obtain configuration data may comprise to obtain configuration data to define a network address usable for network communication.

In some embodiments, to obtain configuration data may comprise to obtain configuration data to define a setting for communication with an I/O device or to obtain configuration data to define a bootstrap parameter.

In some embodiments, to obtain configuration data may comprise to obtain configuration data to enable controller-to-controller communication.

In some embodiments, to obtain configuration data may comprise to obtain configuration data to configure a field programmable gate array.

In some embodiments, the compute device may be the industrial device and to configure, in response to obtaining the configuration data, the one or more operations of the industrial device may comprise to configure one or more operations of the compute device.

In some embodiments, the circuitry may be further configured to provide the configuration data to an industrial device connected to the compute device.

In some embodiments, the circuitry may be further configured to cause the compute device to operate as a first controller compute device to a second controller compute device to reconfigure the second controller compute device in response to loss of configuration data in the second controller compute device or to reconfigure the first controller compute device using data from the second controller compute device in response to loss of configuration data in the first controller compute device.

According to another aspect, a method may comprise obtaining, by a compute device and via a secure wireless side channel, configuration data indicative of a configuration for one or more operations of an industrial device of an industrial process plant and configuring, in response to obtaining the configuration data, the one or more operations of the industrial device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
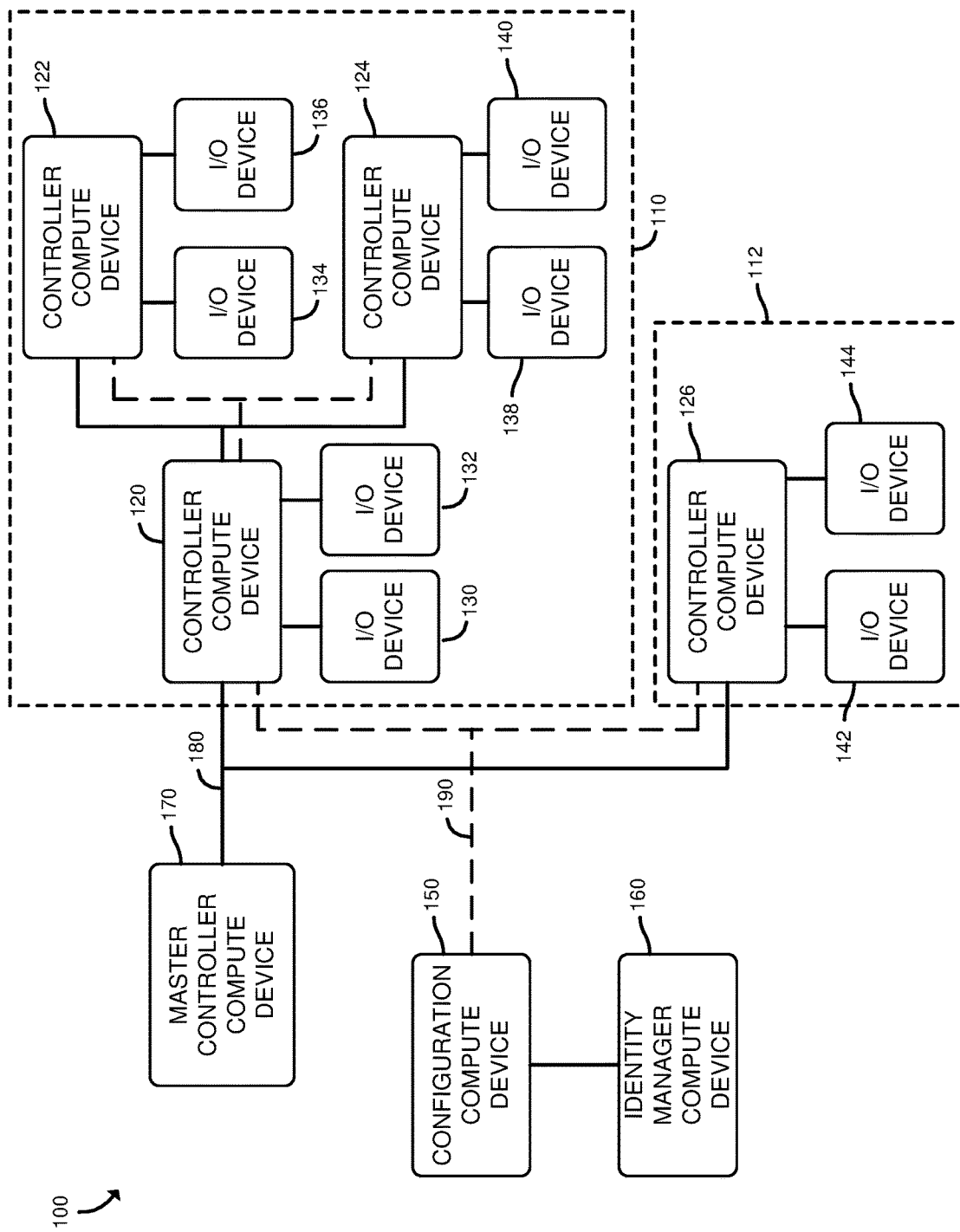
FIG. 1 is a simplified diagram of at least one embodiment of a system for configuring industrial devices through a secured wireless side channel.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for configuring industrial devices through a secured wireless side channel includes industrial plants 110, 112. The industrial plant 110 includes three controller compute devices ("controllers") 120, 122, 124. Each controller compute device 120, 122, 124 may be embodied as any device or circuitry configured to receive data from and/or send data to one or more devices connected to the controller compute device 120, 122, 124 to control one or more industrial operations to be performed in the corresponding industrial plant 110 (e.g., an oil refinery plant, a power generation plant, a factory, etc.). In the illustrative embodiment, the controller compute device 120 is connected to multiple I/O devices 130, 132, each of which may be embodied as any device configured to receive data from the controller compute device 120, perform operations based on the data received from the controller compute device 120 (e.g., to open or close a valve, to activate a switch, to obtain a measurement of a condition such as a temperature, a pressure, a voltage, etc.), and/or send data to the controller compute device 120 (e.g., a data indicative of a measured condition, such as a measured temperature, data indicative of a result of performing a function, such as data indicating that a valve was successfully opened or closed, etc.). Likewise, the controller compute device 122 is connected to I/O devices 134, 136 and the controller 124 is connected to the I/O devices 138, 140. The I/O devices 134, 136, 138, 140 are similar to the I/O devices 130, 132 described above. Similarly, industrial plant 112 includes a controller compute device 126, similar to the controller compute device 120, that is connected to multiple I/O devices 142, 144, which are similar to the I/O devices 130, 132, 134, 136, 138, 140 described above. In the illustrative embodiment, a master controller compute device 170 is in communication with the controller compute device 120 and the controller compute device 122 to monitor and coordinate the operations of each industrial plant 110, 112 by communicating with the respective controller compute devices 120, 126. Each of the devices 120, 122, 124, 126, 130, 132, 134, 136, 138, 140, 142, 144 at the industrial plants 110, 112 are referred to herein as "industrial devices" as they contribute to the execution of industrial processes (e.g., oil refining, power generating, product manufacturing, etc.) at the respective industrial plants 110, 112.

Importantly, the system 100 also includes a configuration compute device 150, which may be embodied as any device (e.g., a handheld computer, a notebook computer, a smartphone, etc.) configured to establish a connection with an industrial device (e.g., a controller compute device 120, 126) to configure or reconfigure the industrial device on an as-needed basis (e.g., to restore network address data, to update process parameters, to provide configuration data to be passed to a downstream industrial device, etc.) through a wireless side-channel. That is, while the industrial devices (e.g., controller compute devices 120, 126) are typically connected to a network 180 (e.g., a wireless network, such as a cellular network, a Wi-Fi network, or a wired network, etc.) (a "primary channel"), the industrial devices (e.g., controller compute devices 120, 126) are also equipped with circuitry to communicate through a wireless side channel 190 that utilizes a security protocol (e.g., a token-based messaging system described herein), to obtain, from the configuration compute device 150 configuration data to restore connectivity to the primary channel 180 and/or to configure other operations of the industrial device 120, 126.

Further, one industrial device (e.g., the controller compute device 120) may operate as a configuration compute device for a connected (e.g., downstream) industrial compute device (e.g., the controller compute device 122) by providing received configuration data (e.g., originally from the configuration compute device 150) to the downstream industrial compute device (e.g., through the wireless side channel 190 or through a wired connection). In the illustrative embodiment, the system 100 also includes an identity manager compute device 160 which may be embodied as any device (e.g., computer) configured to store tokens (e.g., each a set of data usable as unique identifier to indicate that a device sending a message containing the token is authorized to communicate with the receiving device for a given communication session (e.g., a configuration session)). That is, in the illustrative embodiment, to provide enhanced security, tokens are stored in the identity manager compute device 160, which operates as a centralized secure repository for tokens, rather than being stored locally by the devices (e.g., the configuration compute device 150, the controller compute device 120, etc.) communicating using the token-based secure messaging. Accordingly, by using a secure wireless side channel (e.g., via the wireless side channel 190) to provide configuration data (e.g., to re-establish network connectivity to an industrial device (e.g., through the network 180)), rather than requiring personnel to physically access an industrial device to reconfigure the industrial device, the system 100 provides cost savings (e.g., in terms of labor to physically travel to and access each industrial device) and improved security (e.g., by reducing the attack surface) over typical systems in industrial plants.

Figure 2:
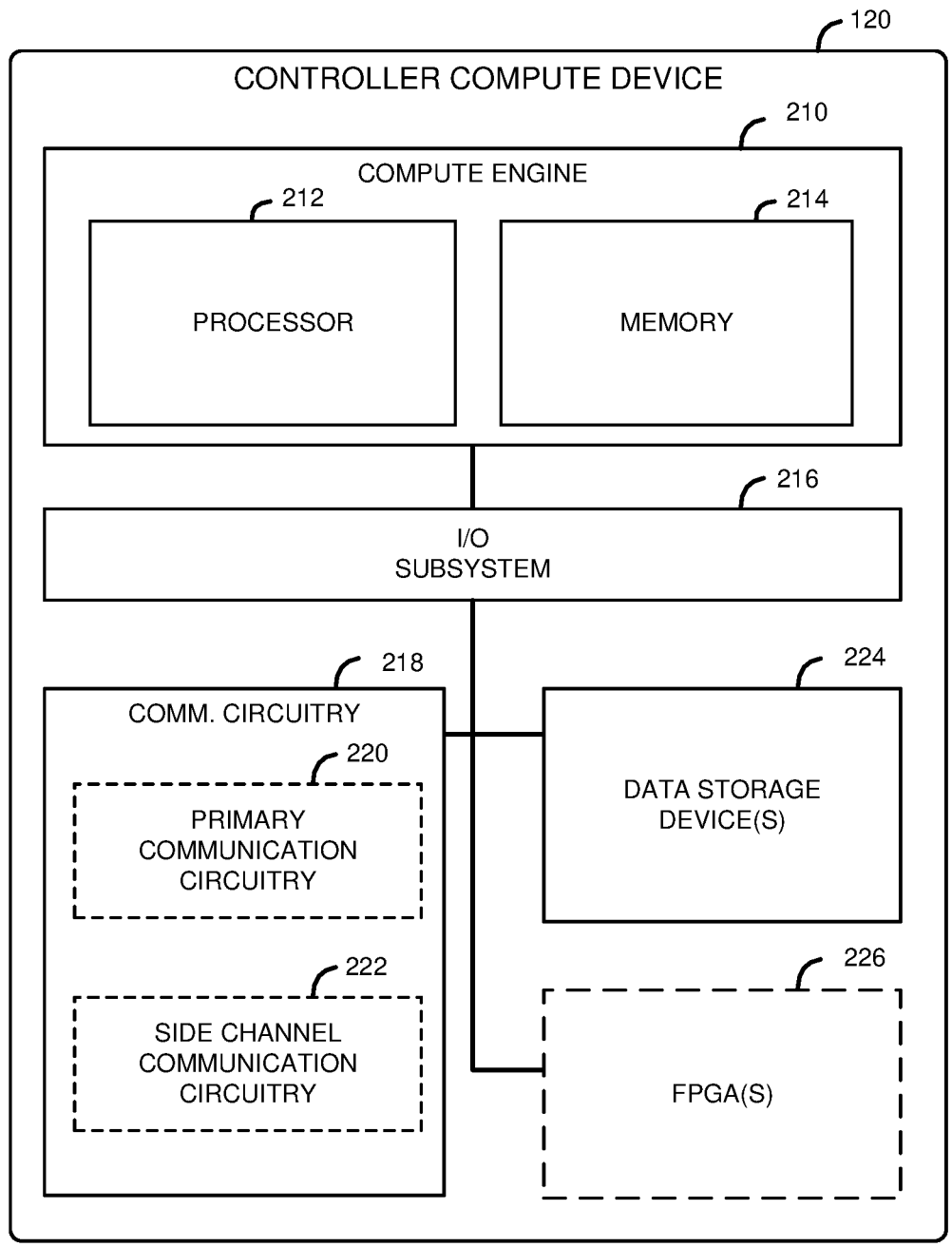
FIG. 2 is a simplified block diagram of at least one embodiment of a controller compute device of the system of FIG. 1.

Referring now to FIG. 2, the illustrative controller compute device 120 includes a compute engine 210, an input/output (I/O) subsystem 216, communication circuitry 218, a data storage subsystem 224, and a set of field-programmable gate arrays (FPGAs) 226. Of course, in other embodiments, the controller compute device 120 may include other or additional components, such as those commonly found in a computer (e.g., display, peripheral devices, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, an FPGA, a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as configuration data (e.g., one or more network addresses, data defining settings to enable communication with connected I/O devices such as port numbers and/or communication protocols, FPGA settings, etc.), data received from other devices in communication with the controller compute device (e.g., a sensor measurement from a connected I/O device, etc.), data to be sent to other devices in communication with the controller compute device, applications, programs, libraries, and drivers.

The compute engine 210 is communicatively coupled to other components of the controller compute device 120 via the I/O subsystem 216, which may be embodied as circuitry and/or components to facilitate input/output operations with the compute engine 210 (e.g., with the processor 212 and the main memory 214) and other components of the controller compute device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the controller compute device 120, into the compute engine 210.

The communication circuitry 218 may be embodied as any communication circuit(s), device(s), or collection thereof, capable of enabling communications over a primary communication channel (e.g., the network 180) and a side channel (e.g., the side channel 190) between the controller compute device 120 and one or more other devices in the system 100. The communication circuitry 218 may be configured to use any one or more communication technology (e.g., wired or wireless communications) and associated protocols (e.g., Ethernet, Bluetooth®, Wi-Fi®, WiMAX, 3G, 4G, 5G, etc.) to effect such communication.

The illustrative communication circuitry 218 includes primary communication circuitry 220 and side channel communication circuitry 222. The primary communication circuitry may be embodied as a network interface controller (NIC), such as one or more add-in-boards, daughter cards, network interface cards, controller chips, chipsets, or other devices that may be used by the controller compute device 120 to connect with another device (e.g., via the network 180, also referred to as the primary communication channel, etc.). In some embodiments, the primary communication circuitry 220 may be embodied as part of a system-on-a-chip (SoC) that includes one or more processors, or included on a multichip package that also contains one or more processors. In some embodiments, the primary communication circuitry 220 may include a local processor (not shown) and/or a local memory (not shown) that are both local to the primary communication circuitry 220. In such embodiments, the local processor of the primary communication circuitry 220 may be capable of performing one or more of the functions of the compute engine 210 described herein. Additionally or alternatively, in such embodiments, the local memory of the primary communication circuitry 220 may be integrated into one or more components of the controller compute device 120 at the board level, socket level, chip level, and/or other levels.

The side channel communication circuitry 222 is similar to the primary communication circuitry 220 and the description of the primary communication circuitry 220 applies to the side channel communication circuitry 222, with the exception that the side channel communication circuitry 222 is configured to enable wireless communication via a separate channel (e.g., the side channel 190). In the illustrative embodiment, the side channel communication circuitry 222 is assigned a fixed address or fixed identifier (e.g., a static network internet protocol (IP) address, media access control (MAC) address, identifier or name using an ordered sequence of characters) that is usable by another device (e.g., the configuration compute device 150) to initiate communication with the controller compute device 120 through the wireless side channel 190.

Each data storage device 224, may be embodied as any type of device configured for short-term or long-term storage of data such as, for example, memory devices and circuits, memory cards, hard disk drives, solid-state drives, or other data storage device. Each data storage device 224 may include a system partition that stores data and firmware code for the data storage device 224 and one or more operating system partitions that store data files and executables for operating systems.

Each FPGA 226 may be embodied as a semiconductor device based around a matrix of configurable logic blocks (CLBs) connected via programmable interconnects. Each FPGA may be reprogrammed to desired application or functionality requirements (e.g., as defined by a data set known as a "bitstream") after manufacturing. As such, the FPGAs 226 may execute a set of defined functions faster than could otherwise be performed by a general purpose central processing unit (CPU) processor that reads and executes instructions defined in a computer program.

The devices 122, 124, 126, 130, 132, 134, 136, 138, 140, 142, 144, 150, 160, and 170 may have components similar to those described with reference to the controller compute device 120. The description of those components of the controller compute device 120 is equally applicable to the description of components of the devices 122, 124, 126, 130, 132, 134, 136, 138, 140, 142, 144, 150, 160. However, in some embodiments, some of the devices 122, 124, 126, 130, 132, 134, 136, 138, 140, 142, 144, 150, 160 may not include the side channel communication circuitry 222 and/or the FPGA(s) 226. Further, it should be appreciated that any of the controller compute device 120 and the other devices 122, 124, 126, 130, 132, 134, 136, 138, 140, 142, 144, 150, 160 in the system 100 may include other components, subcomponents, and devices commonly found in a computing device, which are not discussed above in reference to the controller compute device 120 and not discussed herein for clarity of the description. Further, it should be understood that one or more components of the controller compute device 120 may be distributed across any distance, and are not necessarily housed in the same physical unit. Additionally, while the system 100 in FIG. 1 is shown with two industrial plants 110, 112 with three controller compute devices 120, 122, 124 at the first industrial plant 110 and one controller compute device 126 at the second industrial plant 112 and two I/O devices connected to each controller compute device 120, 122, 124, 126, the number of industrial plants, controller compute devices, and I/O devices may vary from one embodiment to another and may number in the tens, hundreds, thousands, or more.

Referring to FIG. 1, the network 180 (the primary channel), may be embodied as any type of data communication network, including local area networks (LANs) or wide area networks (WANs), digital subscriber line (DSL) networks, cable networks (e.g., coaxial networks, fiber networks, etc.), global networks (e.g., the Internet), cellular networks (e.g., Global System for Mobile Communications (GSM), 3G, Long Term Evolution (LTE), Worldwide Interoperability for Microwave Access (WiMAX), 4G, 5G, etc.), a radio access network (RAN), an edge network, or any combination thereof. The side channel 190, in the illustrative embodiment, is a wireless communication channel (e.g., Bluetooth, Wi-Fi, one or more cellular networks (e.g., Global System for Mobile Communications (GSM), 3G, Long Term Evolution (LTE), Worldwide Interoperability for Microwave Access (WiMAX), 4G, 5G, etc.), a radio access network (RAN), etc.) that utilizes one or more security protocols (e.g., transport layer security (TLS), token-based messaging, etc.) as described in more detail herein.

Figure 3:
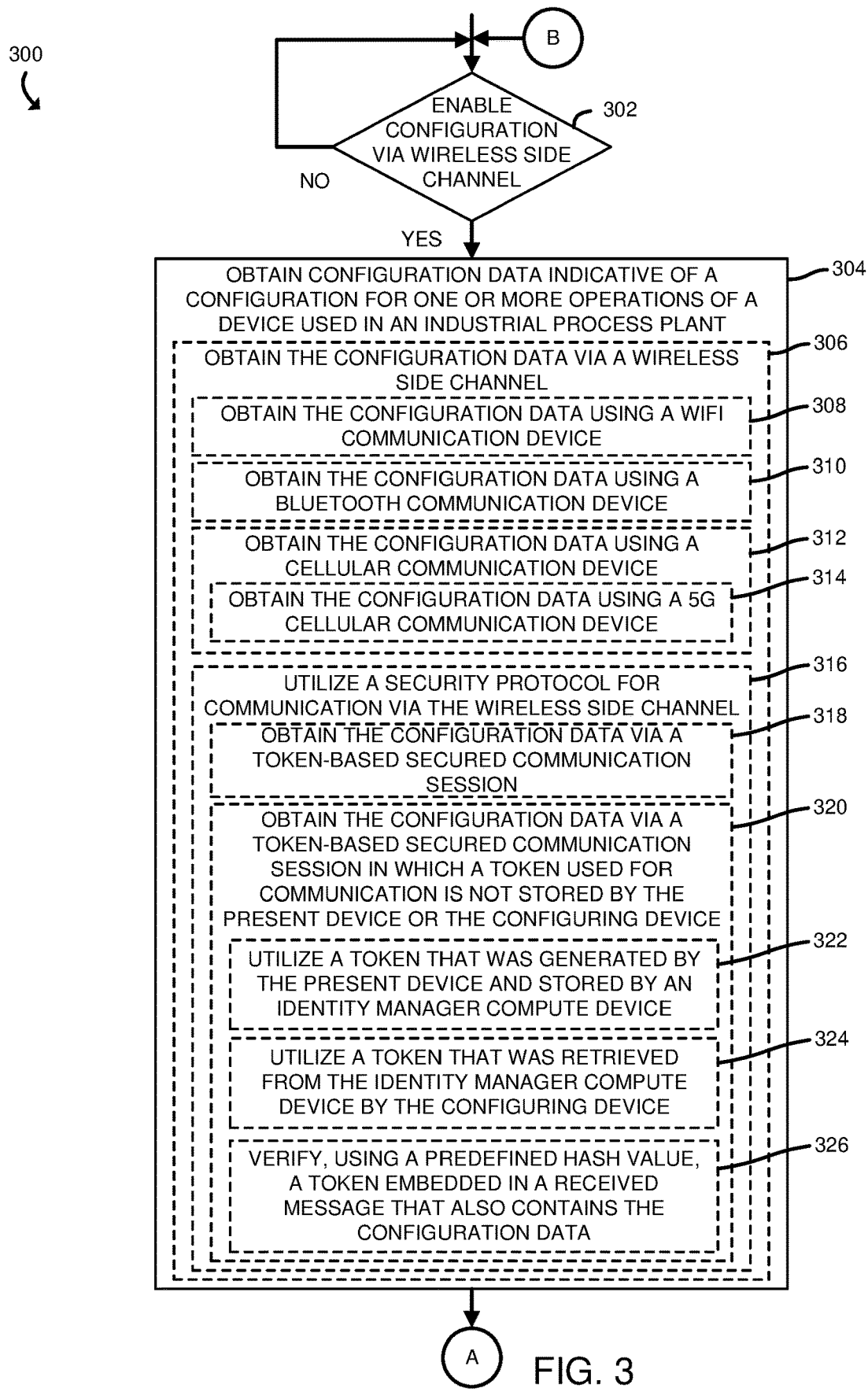
FIGS. 3-4 are simplified block diagrams of at least one embodiment of a method for configuring industrial devices through a secured wireless side channel that may be performed by the system of FIG. 1.

Referring now to FIG. 3, the system 100, and in particular, the controller compute device 120, may perform a method 300 for configuring industrial device(s) (e.g., the controller compute device 120 itself and/or other devices) via a wireless side channel (e.g., the wireless side channel 190 in FIG. 1). In the illustrative embodiment, the method 300 begins with block 302, in which the controller compute device 120 determines whether to enable configuration via a wireless side channel. In doing so, the controller compute device 120 may determine to enable configuration via a wireless side channel in response to a determination that the controller compute device 120 is equipped with the side channel communication circuitry 222, in response to a determination that a configuration setting (e.g., in the memory 214) indicates to do so, in response to a request (e.g., from another device, such as the configuration compute device 150) to do so, and/or based on other factors. Regardless, in response to a determination to enable configuration via a wireless side channel, the method 300 advances to block 304, in which the controller compute device 120 obtains configuration data indicative of a configuration for one or more operations of a device (an "industrial device") used in an industrial process plant (e.g., the industrial plant 110). In doing so, and as indicated in block 306, the controller compute device 120, in the illustrative embodiment, obtains the configuration data via a wireless side channel (e.g., the side channel 190 of FIG. 1).

As indicated in block 308, the controller compute device 120 may obtain the configuration data (e.g., via the side channel 190) using a Wi-Fi communication device (e.g., the side channel communication circuitry 222 is configured to receive the configuration data using a wireless communication protocol conforming to the Institute of Electrical and Electronics Engineers (IEEE) 802.11 family of standards). Alternatively, and as indicated in block 310, the controller compute device 120 may obtain the configuration data (e.g., via the side channel 190) using a Bluetooth communication device (e.g., the side channel communication circuitry 222 is configured to receive the configuration data using a wireless communication protocol defined by the Bluetooth Special Interest Group). In other embodiments, and as indicated in block 312, the controller compute device 120 may obtain the configuration data (e.g., via the side channel 190) using a cellular communication device (e.g., the side channel communication circuitry 222 is configured to receive the communication data using a cellular network). For example, and as indicated in block 314, the controller compute device 120 may obtain the configuration data using a 5G cellular communication device (e.g., the side channel communication circuitry is configured to communication over a 5G cellular network that conforms to standards developed by the 3$^{rd}$ Generation Partnership Project (3GPP)).

Still referring to FIG. 3, in the illustrative embodiment, the controller compute device 120 utilizes a security protocol for communication via the wireless side channel 190, as indicated in block 316. In doing so, and as indicates in block 318, the controller compute device 120 may obtain the configuration data via a token-based secured communication session. As indicated in block 320, the controller compute device 120 may obtain the configuration data via a token-based communication session in which a token used for communication is not stored by the present device (e.g., the controller compute device 120) or by the configuring device (e.g., the device (e.g., the configuration compute device 150) sending the configuration data). Further, and as indicated in block 322, the controller compute device 120 may utilize a token that was generated by the present device (e.g., the controller compute device 120) and stored by an identity manager compute device (e.g., the identity manager compute device 160 of FIG. 1).

As indicated in block 324, the controller compute device 120 may utilize a token that was retrieved from the identity manager compute device (e.g., the identity manager compute device 160) by the configuring device (e.g., the configuration compute device 150). Additionally, and as indicated in block 326, the controller compute device 120 may verify, using a predefined hash value, a token (e.g., the token referenced in blocks 322, 324) embedded in a received message (e.g., from the configuration compute device 150) that also contains the configuration data. For example, the controller compute device 120 may perform a mathematical operation on the received token and determine whether the result of the mathematical operation matches the predefined hash value, in which case, the token is determined to be verified. The token-based communication is described in more detail herein, with reference to FIGS. 5-7. Additionally, in some embodiments, the token-based communication may be used as an additional layer of security to another security protocol, such as a security protocol defined by a standards organization (e.g., transport layer security (TLS), defined by the Internet Engineering Task Force (IETF)) or a proprietary security protocol.

Figure 4:
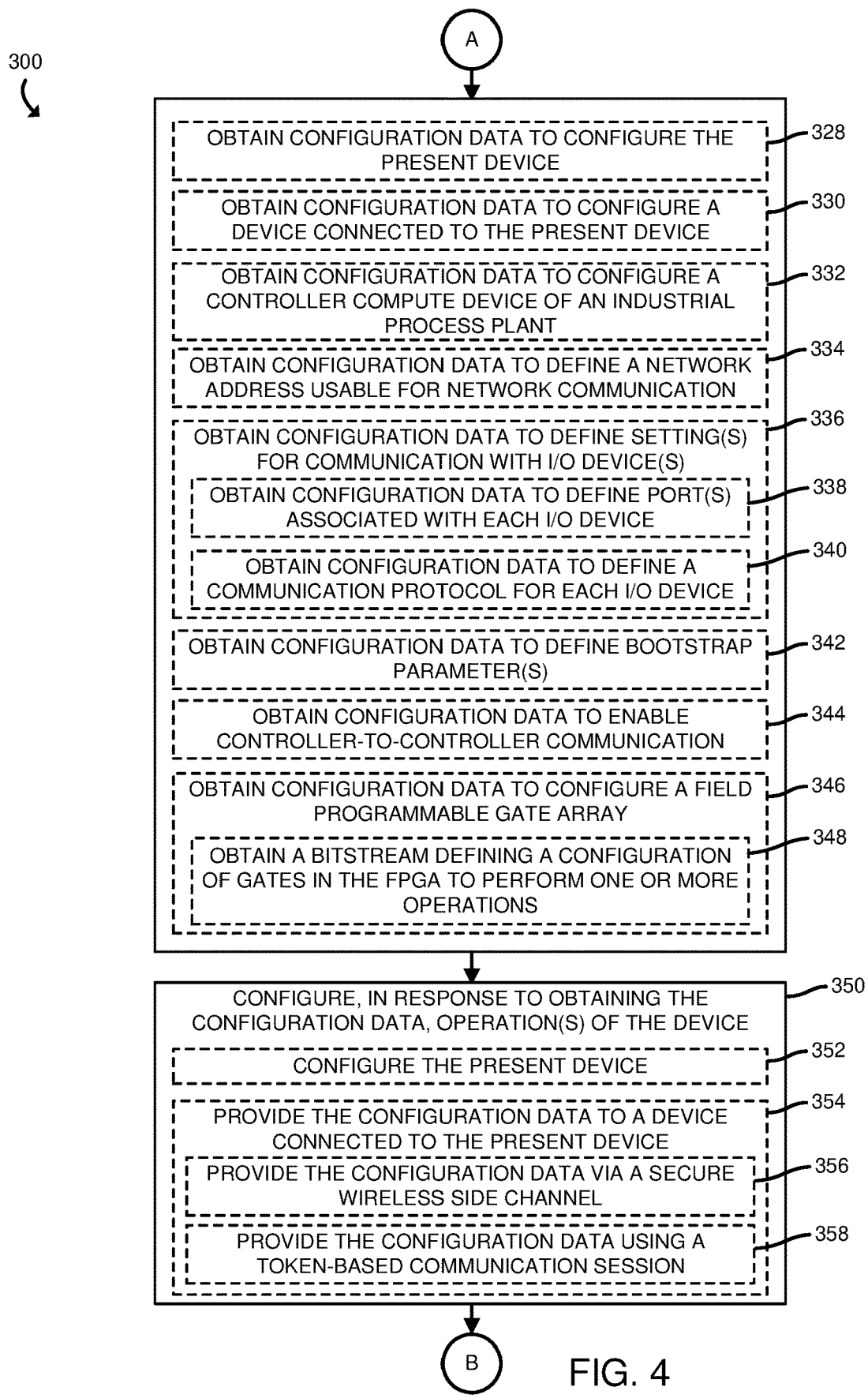

Referring now to FIG. 4, in obtaining the configuration data, the controller compute device 120 may obtain the configuration data to configure the present device (e.g., to configure settings of the controller compute device 120 itself), as indicated in block 328. Additionally or alternatively, the controller compute device 120 may obtain the configuration data to configure a device connected to the present device (e.g., an industrial device connected to controller compute device 120), as indicated in block 330. Relatedly, and as indicated in block 332, the controller compute device 120 may obtain the configuration data to configure a controller compute device of an industrial plant (e.g., a controller compute device 122, 124 downstream of the controller compute device 120 in the industrial plant 110). In some embodiments, the controller compute device 120 may obtain configuration data to configure one or more other industrial devices (e.g., one or more I/O devices 130, 132, etc.).

The controller compute device 120 may obtain configuration data to define a network address usable for network communication, as indicated in block 334. For example, the controller compute device 120 may obtain configuration data that defines an internet protocol address to be used by the primary communication circuitry 220 to communicate through the primary channel (the network 180 of FIG. 1). Additionally or alternatively, the controller compute device 120 may obtain configuration data to define one or more settings for communication with one or more I/O devices (e.g., the I/O devices 130, 132), as indicated in block 336. In doing so, as indicated in block 338, the controller compute device 120 may obtain configuration data to define one or more ports associated with each I/O device (e.g., an input port, an output port, a combined input/output port, etc. associated with each I/O device 130, 132). Similarly, the controller compute device 120 may obtain configuration data to define a communication protocol for each I/O device (e.g., analog, digital, HART, Modbus, Profibus, Ethernet, TCP/IP, etc.), as indicated in block 340.

Still referring to FIG. 4, in obtaining configuration data, the controller compute device 120 may obtain configuration data to define bootstrap parameters (e.g., settings provided to a bootloader program used in the initialization phase of an operating system, to define a mode in which the operating system is to operate, to enable or disable certain features of the operating system, etc.), as indicated in block 342. In some embodiments, as indicated in block 344, the controller compute device 120 may obtain configuration data to enable controller-to-controller communication (e.g., to enable the controllers to generate configuration parameters that are compatible with a set of defined requirements, to coordinate the replacement of a device, to define media access control (MAC) and internet protocol (IP) address pairs, to manage IP address conflicts, etc.). As indicated in block 346, the controller compute device 120 may obtain configuration data to configure an FPGA (e.g., one of the FPGAs 226). In doing so, and as indicated in block 348, the controller compute device 120 may obtain a bitstream defining a configuration of logic gates in an FPGA to perform one or more operations, as indicated in block 348.

In response to obtaining the configuration data, the controller compute device 120 configures one or more operations of the device (e.g., the device to which the configuration data pertains), as indicated in block 350. In doing so, and as indicated in block 352, the controller compute device 120 may configure the present device (e.g., the controller compute device 120). Additionally or alternatively, the controller compute device 120 may provide the configuration data to a device connected to the present device (e.g., connected to the controller compute device 120), as indicated in block 354. That is, the controller compute device 120 may operate as if it is a configuration compute device 150 to assist in the configuration of another device. In doing so, and as indicated in block 356, the controller compute device 120 may provide the configuration data via a secure wireless side channel (e.g., using the side channel communication circuitry 222). In some embodiments, one controller compute device may operate redundantly to another controller compute device. A controller set up in a redundant configuration may have a primary controller compute device and a similar redundant controller compute device communicatively coupled thereto. As such, if the primary controller compute device loses its configuration, the redundant controller compute device may reconfigure the primary controller compute device, or vice versa. For example, one controller compute device may perform an automatic recovery of its address (network address, such as an IP address) using the redundant controller compute device. As indicated in block 358, the controller compute device 120 may provide the configuration data using a token-based communication session, similar to the token-based communication discussed above with reference to blocks 318, 320, 322, 324, 426. In other embodiments, the controller compute device 120 may provide the configuration data to another device through another communication channel (e.g., a wired communication channel) rather than using the wireless side channel 190. Subsequently, the method 300 loops back to block 302 of FIG. 3 in which the controller compute device 120 determines whether to continue to enable configuration via a wireless side channel (e.g., to reconfigure the controller compute device 120 and/or another industrial device).

Figure 5:
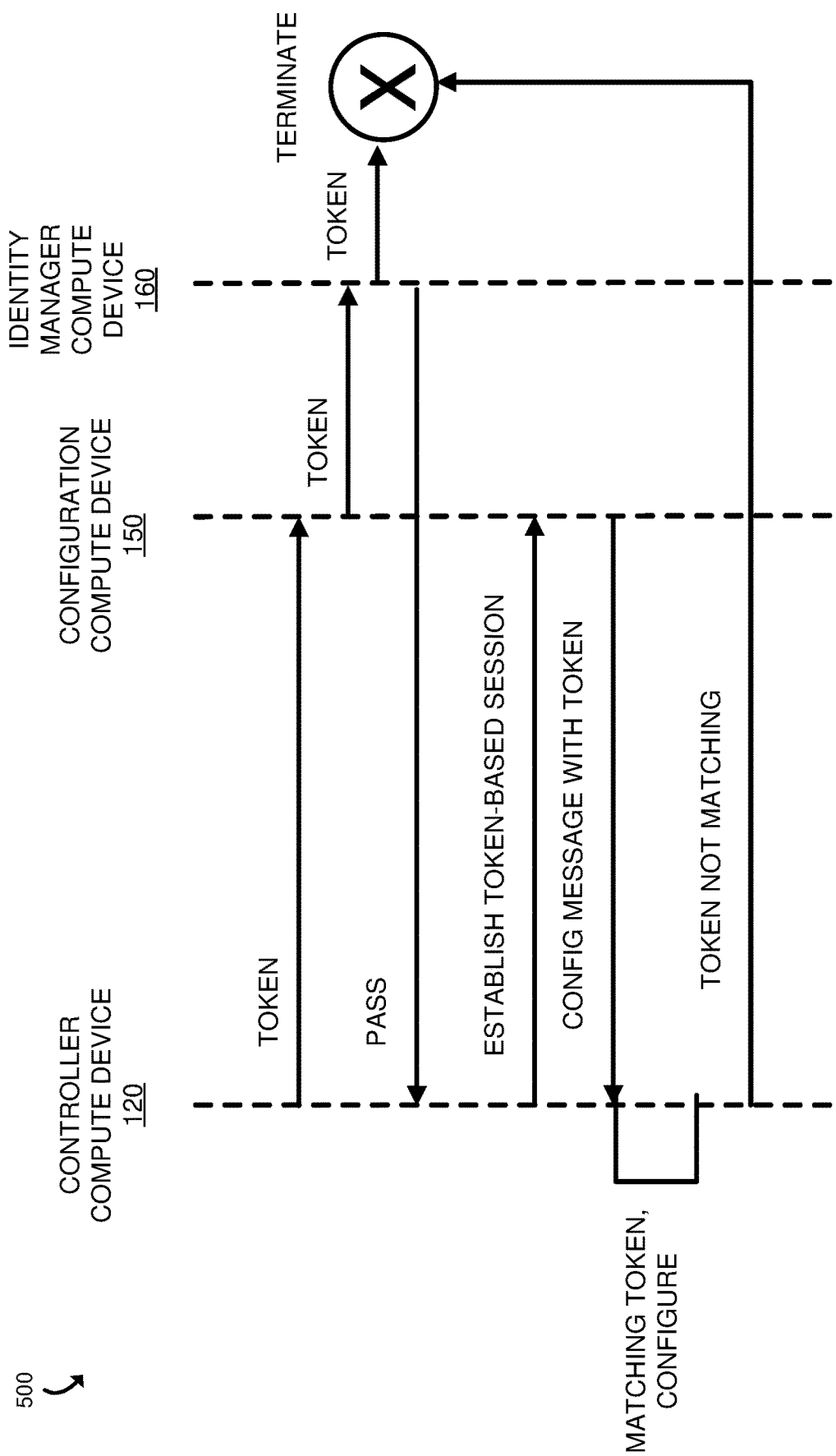
FIG. 5 is a swim lane diagram of messages sent among a controller compute device, a configuration device, and an identity manager compute device of the system of FIG. 1 to utilize token-based wireless side channel communication to configure the controller compute device.
Figure 6:
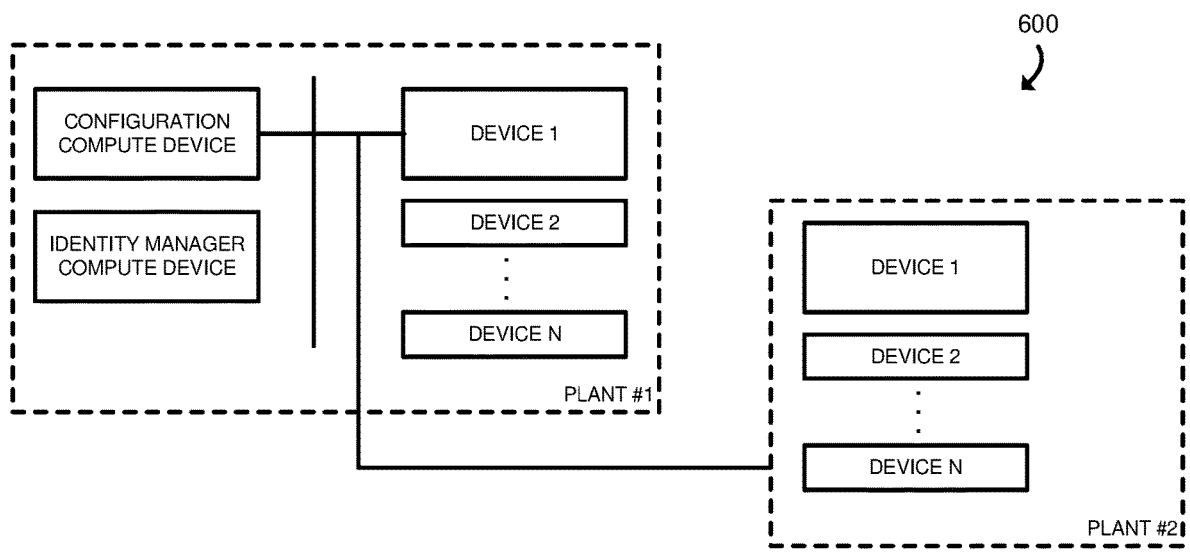
FIG. 6 is a diagram of industrial devices at multiple industrial plants that may be configured using a secured wireless side channel.
Figure 7:
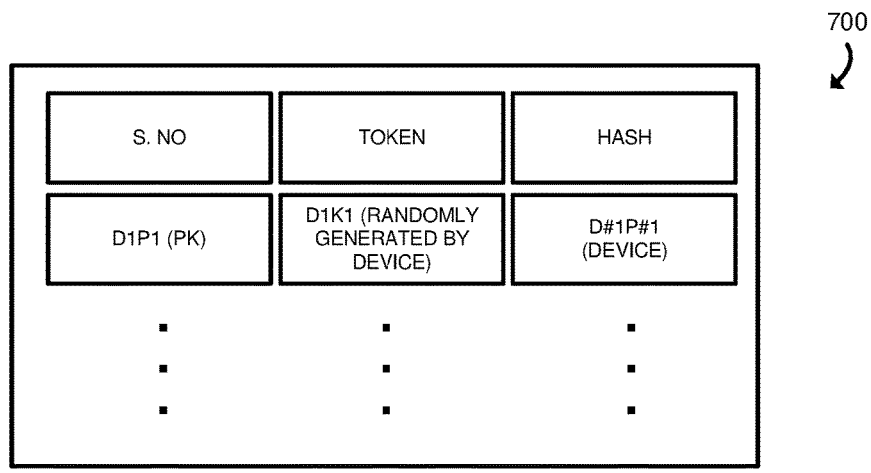
FIG. 7 is a diagram of a data structure that may be used by the system of FIG. 1 to store tokens and hashes usable in conducting secured wireless side channel communications to configure industrial devices.

Referring now to the swim lane diagram of messages 500 in FIG. 5, the system diagram 600 of FIG. 6, and the data structure 700 in FIG. 7, in the illustrative embodiment, user defined mechanisms are deployed to establish trust between an industrial device (e.g., the controller compute device 120) and the configuration tool (e.g., the configuration compute device 150), using a token, certificate, and/or security key(s). That is, the industrial device and the configuration tool perform a mutual authentication process before establishing a session for configuration of the industrial device. As discussed above, given that the configuration operations are carried out through a wireless connection (e.g., wireless side channel 190), the security mechanisms provide a layer of protection against cyber attacks in which unauthorized device(s) may otherwise reconfigure one or more industrial devices in an industrial plant 110, 112 to adversely affect their operation. In the illustrative embodiment, the configuration compute device 150 connects to the industrial device to be configured (e.g., the controller compute device 120) using a dedicated address through which communication can be established in a secure manner (e.g., a dedicated address to access the controller compute device 120 through the side channel 190). In the initial step, communication is established, for example, with encrypted messages between the configuration tool (e.g., the configuration compute device 150) and the industrial device to be configured (e.g., the controller compute device 120).

On establishing the initial communication, a token-based messaging service is established for an exclusive communication between the configuration tool and the industrial device, for device configuration. If a token mismatch occurs between the industrial device and the configuration tool, the configuration session is terminated. The lifetime (e.g., duration) of a token is also established such that the session associated with the token lasts for a predefined amount of time (e.g., one or more minutes). As discussed above, in the illustrative embodiment, tokens are not stored in the industrial device (e.g., the controller compute device 120) or in the configuration compute device 120. Rather, the token is stored in and retrieved from a back end secured store (e.g., the identity manager compute device 160) on an as-needed basis. A security boot strap is established through generation of an initial random token by the industrial device to be configured (e.g., the controller compute device 120) and shared with the configuration tool (e.g., the configuration compute device 150). In turn, the configuration compute device 150 sends the received token to the secured backend storage (e.g., the identity manager compute device 160), which is mutually authenticated.

Upon establishment of the connection between the configuration tool (e.g., the configuration compute device 150) and the industrial device (e.g., the controller compute device 120), for each configuration session, the configuration tool (e.g., the configuration compute device 150) pulls (e.g., retrieves) the corresponding token from the secured backend storage (e.g., the identity manager compute device 160) and the messaging service embeds the token in configuration message(s) sent from the configuration tool (e.g., the configuration compute device 150) to the industrial device (e.g., the controller compute device 120). The industrial device (e.g., the controller compute device 120 receiving configuration message(s)) performs a verification operation on the token embedded in the message(s) and accepts the configuration message(s) in response to the verification operation confirming that the token satisfied the verification operation (e.g., that the token matches a predefined value, that a result of a predefined mathematical operation on the received token matches a predefined hash value, that the token, when operated on using a predefined hash value, matches a predefined expected value, etc.). Otherwise, the industrial device (e.g., the controller compute device 120) rejects the configuration message(s).

In some embodiments, each command (e.g., configuration message) represents a complete configuration session (e.g., assigning an IP address to the industrial device). On expiration of the session, the connection is aborted. As indicated above, the token verification process, in some embodiments, is carried out against a hash value corresponding to the token and on expiration of a session, a new token is generated by the industrial device (e.g., the controller compute device 120) for future configuration sessions. In some embodiments, the system 100 may provide additional value-added services such as user authentication, connectivity configuration (e.g., 5G, Bluetooth, etc.), application access mechanisms, roll back mechanisms, trigger services in an industrial device for automatic configuration, and/or others for industrial devices.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:
1. A compute device comprising:
   primary communication circuitry configured to communicate through a network with an industrial device of an industrial process plant, wherein the primary communication circuitry is configured to receive configuration data from a master controller compute device, the configuration data indicative of a configuration for one or more operations of the industrial device through the network;
   side channel communication circuitry configured to communicate with the industrial device through a secure wireless side channel that is different from the network; and
   circuitry configured to:
      determine the network is unavailable;

enable, in response to the determination that the network is unavailable, the secure wireless side channel;

obtain, via the secure wireless side channel, the configuration data from a configuration compute device; and configure, in response to obtaining the configuration data, the one or more operations of the industrial device.

2. The compute device of claim 1, wherein the side channel communication circuitry is configured to communicate using a Wi-Fi protocol, a Bluetooth protocol, or a cellular communication protocol.

3. The compute device of claim 2, wherein the side channel communication circuitry is configured to communicate using a 5G cellular communication protocol.

4. The compute device of claim 1, wherein the circuitry is further configured to utilize a security protocol for communication via the secure wireless side channel.

5. The compute device of claim 4, wherein the circuitry is configured to obtain the configuration data via a token-based secured communication session.

6. The compute device of claim 5, wherein the circuitry is configured to obtain the configuration data via a token-based secured communication session in which a token used for communication is not stored by the compute device or a configuration compute device from which the configuration data is received.

7. The compute device of claim 5, wherein the circuitry is configured to utilize a token that was generated by the compute device and stored by an identity manager compute device.

8. The compute device of claim 5, wherein the circuitry is further configured to utilize, for the token-based secured communication, a token that was retrieved from an identity manager compute device by the configuration compute device.

9. The compute device of claim 5, wherein the circuitry is further configured to verify, using a predefined hash value, a token embedded in a received message that also contains the configuration data.

10. The compute device of claim 1, wherein the compute device is the industrial device and to obtain configuration data comprises to obtain configuration data to configure one or more operations of the compute device.

11. The compute device of claim 1, wherein to obtain configuration data comprises to obtain configuration data to configure a device connected to the compute device.

12. The compute device of claim 1, wherein to obtain configuration data comprises to obtain configuration data to configure a controller compute device in an industrial process plant.

13. The compute device of claim 1, wherein to obtain configuration data comprises to obtain configuration data to define a network address usable for network communication.

14. The compute device of claim 1, wherein to obtain configuration data comprises to obtain configuration data to define a setting for communication with an I/O device or to obtain configuration data to define a bootstrap parameter.

15. The compute device of claim 1, wherein to obtain configuration data comprises to obtain configuration data to enable controller-to-controller communication.

16. The compute device of claim 1, wherein to obtain configuration data comprises to obtain configuration data to configure a field programmable gate array.

17. The compute device of claim 1, wherein the compute device is the industrial device and to configure, in response to obtaining the configuration data, the one or more operations of the industrial device comprises to configure one or more operations of the compute device.

18. The compute device of claim 1, wherein the circuitry is further configured to provide the configuration data to an industrial device connected to the compute device.

19. The compute device of claim 1, wherein the circuitry is further configured to cause the compute device to operate as a first controller compute device to a second controller compute device to reconfigure the second controller compute device in response to loss of configuration data in the second controller compute device or to reconfigure the first controller compute device using data from the second controller compute device in response to loss of configuration data in the first controller compute device.

20. A method comprising:

obtaining, by a compute device and via a secure wireless side channel, configuration data from a configuration compute device when a network is unavailable, the configuration data indicative of a configuration for one or more operations of an industrial device of an industrial process plant, wherein the compute device includes:

primary communication circuitry configured to communicate through the network with the industrial device, wherein the primary communication circuitry is configured to receive configuration data from a master controller compute device through the network; and side channel communication circuitry configured to communicate with the industrial device through the secure wireless side channel that is different from the network; and configuring, in response to obtaining the configuration data, the one or more operations of the industrial device, when the network is unavailable.

* * * * *